May 6, 1952     W. T. GRAHAM     2,595,352

BEAM CLAMP

Filed Dec. 5, 1947

Inventor
William T. Graham
By Fishburn & Mullendor
Attorneys

Patented May 6, 1952

2,595,352

UNITED STATES PATENT OFFICE 2,595,352

BEAM CLAMP

William T. Graham, Amarillo, Tex.

Application December 5, 1947, Serial No. 789,952

12 Claims. (Cl. 248—228)

This invention relates to a ground working machine of the type including a wheel supported frame carrying a plurality of ground working tools which are mounted on resilient shanks attached to the frame in the manner disclosed in my copending application for patent on Clamp, Serial No. 730,992, and which has matured into United States Letters Patent No. 2,507,783 dated May 16, 1950, the present application being directed to improvements in the attaching clamps. The clamps disclosed in the above-mentioned application operate satisfactorily in ordinary soils, but some difficulty is encountered when the plows are used in rocky ground in that the obstructions tend to bend the plow frame and particularly the flanges of the structural members to which the shanks are attached. Also it is difficult to retain the shanks tightly in the clamps.

Therefore, the principal objects of the invention are to provide the clamps with means for preventing distortion of the flanges and to prevent pulling loose of the resilient shanks by the forces developed when the ground working tools strike an obstruction.

Other objects of the invention are to provide a clamp, which includes a top flange engaging plate having direct connection with the resilient shank of the ground working tools so as to supplement the frictional contact of the clamp in holding the shank; to provide a clamp with means for transmitting forces, tending to bend the lower flange, to the upper flange; and to provide a split clamp that can be applied to the I-beam member of the frame without disassembling the frame.

In accomplishing these and other objects of the invention hereinafter pointed out, I have provided improved structure, the preferred form of which is illustrated in the accompanying drawing wherein:

Fig. 1 is a sectional perspective view of a portion of the frame of a ground working machine and illustrating application of a clamp constructed in accordance with the present invention for anchoring the shank of a ground working tool.

Fig. 2 is a section through the clamp on the line 2—2 of Fig. 3.

Fig. 3 is a plan view of the clamp.

Fig. 4 is a sectional view similar to Fig. 2 but showing a modified form of the clamp construction which facilitates mounting of the clamp on an assembled plow frame where the clamp cannot be slid onto the end of the supporting member.

Referring more in detail to the drawings:

1 designates a tool supporting member or portion of the frame of a ground working machine. The supporting member is illustrated in the drawing as comprising an I-beam arranged with the flanges 2 and 3 extending substantially horizontally and the web 4 in a vertical position with the beam extending transversely of the line of draft for attaching the shank 5 of a ground working tool 6 by means of a clamp 7.

As disclosed in the above mentioned application, the shank 5 is of rectangular cross section and has substantially flat upper and lower faces 8 and 9 with the upper face extending transversely across the underface 10 of the lower flange 3. The forward end 11 of the shank projects slightly from the front of the beam and the rear portion of the shank curves rearwardly and downwardly to mount the ground working tool 6 which may be of suitable shape.

The main body of the clamp 7 is identical with the clamp disclosed in the above-noted application and includes a portion 12 of sufficient length to extend across the face 10 of the flange 3 and of greater width than the width of the resilient shank 8 to provide substantially flat faces 13 at the ends adapted to closely underlie the flange on the respective sides of the shank 5. The body portion of the clamp also includes a down set web portion 15 having an upper clamping face 16 corresponding in width to the shank 5 and which is of somewhat longer length than the faces 13. The web portion 15 is connected with the plate portions of the clamp by vertical webs 17 and 18. Extending upwardly from the plate portion 12 of the clamp at the ends of the faces 13 and projecting laterally from the vertical webs 17 and 18 are webs 20 and 21 extending along the edge faces 22 of the flange 3 and which terminate in inwardly extending clamping flanges 23 and 24 that engage the upper faces 25 of the flange 3. The clamping flanges 23 and 24 extend across the space between the vertical webs 17 and 18 to interconnect and brace the vertical webs. The vertical webs 17 and 18 thus cooperate with the bottom web portion 15 to provide a longitudinal channel 26 open at the ends to pass the shank 8 therethrough so that when the lower face 9 of the shank is resting upon the face 16 of the web 15, the upper face 8 lies substantially within the plane of faces 13.

In order to reinforce the body portion of the clamp the webs 17 and 18 depend below the web portion 15 to form spaced parallel arcuate ribs 27 that are interconnected at the centers thereof by a depending internally hollowed boss 28, the hollow portion of which opens inwardly toward the face 16 of the web 15 as shown in Fig. 2. Formed in the web 15 on opposite diametrical sides of the boss 28 are internally threaded openings 29 and 30 with the axes thereof registering with the marginal edges of the lower flange 3 of the supporting member 1 as shown in Figs. 2 and 3. Turned into the threaded openings are set screws 31 and 32, the set screws being provided with polygonal-shaped heads by which the shanks are turned into the threaded openings by means of a suitable wrench (not shown). The webs 20 and 21 and clamping flanges 23 and 24 are reinforced by external ribs 33 adjacent the respective ends of the clamp and the clamping flanges 23 and 24 are additionally reinforced over the set screws by ribs 34 projecting upwardly from the webs 17 and 18.

In applying the clamp thus far described it is passed over the flange 3 at one end of the beam and shifted therealong to its desired position with the clamping flanges 23 and 24 resting upon the upper faces 25 of the beam flange. The shank 5 is then passed through the channel-shaped socket 26 so that the end 11 projects therefrom in the forward direction of the machine. The set screws 31 and 32 are then applied and tightened to draw the clamping flanges 23 and 24 into clamping contact with the upper faces 25 of the flange 3 and the upper face 8 of the shank 5 into clamping contact with the underface 10 of the flange 3 (Fig. 2). The set screws may draw the faces 13 of the plate portion of the clamp slightly out of contact with the underface of the beam, however, the faces are sufficiently close to provide stop engagement therewith and prevent permanent bending or distortion that would ordinarily tend to release the clamp. The set screws are applied so that the pressure points are spread the maximum distance across the width of the flange to reinforce the flange 3 and resist bending thereof incidental to constant pumping or vibratory action of the ground working tool.

The clamp thus far described is satisfactory in retaining the resilient shanks of the plows used in ordinary soils, but, as above stated, some difficulty is encountered when the plow is used on rocky ground. To overcome this difficulty, the present clamp includes an upper plate 35, substantially corresponding in length to the body portion of the lower clamp and having width to extend across the upper flange 2 of the I-beam. The plate 35 has a web 36 extending downwardly along the rear edge in engagement with the rear edge of the flange 2 and which terminates in an inwardly extending flange 37 that engages the underface of the flange 2 somewhat in the manner of a hook, as clearly illustrated in Figs. 1 and 2. The sides of the plate 38 preferably converge inwardly toward the forward edge of the flange and terminate in an ear 39 having an aperture 40 therein which registers with a corresponding aperture 41 formed in the forwardly projecting end 11 of the resilient shank 5, as shown in Fig. 2. Extending through the aperture 40 of the ear 39 and through the aperture 41 is the shank 42 of a bolt 43, the head 44 of which is drawn in the contact of the upper face of the ear when the nut 45 is turned onto the threaded end of the bolt to engage the underside face 9 of the resilient shank. The upper plate is thus drawn tightly against the upper flange of the I-beam and the resilient shank is further retained in connection with the I-beam, so that the shank cannot be pulled from the clamp as when the ground working tool strikes a rock or other obstruction. The bolt 42 and upper plate 35 also distribute stresses from the lower flange to the upper flange, and thereby reduce tendency for the lower flange of the beam to bend.

In the form of the invention illustrated in Fig. 4, the body of the main clamp is formed of two sections 46 and 47, having end flanges or ears 48 and 49 adapted to be secured together by bolts 50 in the same manner as the split form of clamp disclosed in the above mentioned application. In this form of the invention, the clamp section 46 has an arm 51 that may be formed as an integral part of the clamping flange 23 and which has a terminal 52 engageable tightly in the angle formed between the web 4 and the upper flange 2 of the I-beam as shown in Fig. 4. This support also tends to transmit stresses from the lower portion of the I-beam to the upper portion so as to further enhance rigidity of the I-beam and prevent any bending thereof in case the ground working tool should strike some obstruction. In this form of the invention, the clamp members are readily dismountable and can be quickly arranged along the length of the I-beam for any desired spacing without the necessity of disassembling the plow frame as would be the case with a clamp having a unit body construction as shown in the first described form of the invention.

From the foregoing it is obvious that I have provided an improved clamp which is better enabled to retain the resilient shanks and which distributes the stresses exerted on the lower flange of the I-beam to prevent bending or distortion thereof when the plow is used on rocky ground. It is also obvious that the shank of the ground working tool is positively connected with the I-beam by means of the upper clamp plate and bolt, and that the bolt is connected in such manner that the bolt opening does not weaken the strength of the shank.

What I claim and desire to secure by Letters Patent is:

1. In an agricultural machine having an I-beam shaped support and a ground working tool carried upon a shank, clamp means for securing the shank of the ground working tool to said support including independent clamping members respectively engaging upper and lower flanges of said I-beam, one of said clamping members having a passageway receiving a portion of the shank and the other of said clamping members being separably connected to the shank.

2. In an agricultural machine having an I-beam shaped support and a ground working tool carried upon a shank, clamp means for securing the shank of the ground working tool to said support including independent clamping members respectively engaging the upper and lower flanges of said I-beam, one of said clamping members having a passageway receiving a portion of the shank, a fastening device connecting the other member with the shank on one side of the I-beam, and a stress transmitting member on said one clamping member and engaging with the I-beam on the other side of the I-beam.

3. In an agricultural machine having an I-beam shaped support and a ground working tool carried upon a shank, clamp means for securing the shank of the ground working tool to said support including independent clamping members respectively engaging the upper and lower flanges of said I-beam, one of said clamping members having a passageway receiving a portion of the shank, and a bolt member connecting the other of said clamping members to a portion of the shank projecting beyond the first mentioned clamping member.

4. Clamp means for mounting the shank of a ground working tool to an I-beam shaped support of an agricultural machine comprising a lower clamp having a shank-receiving passageway therethrough and having means for engaging over the lower flange of said I-beam, means carried by the lower clamp for drawing said engaging means and said shank into clamping contact with the lower flange of the I-beam to anchor said lower clamp, an upper clamp extending across the upper flange having a hook-like portion for engaging under said upper flange of said I-beam, and a stress transmitting member connecting the extremity of the shank to the upper clamp on the side of the I-beam opposite said hook-like portion.

5. Clamp means for mounting the shank of a ground working tool to an I-beam shaped support of an agricultural machine comprising spaced clamps respectively engaging the upper and lower flanges of said I-beams, means for seating the shank in one of said clamps, and means connecting the shank to the other of said clamps on one side of the I-beam support whereby stresses from the shank are transmitted to each flange of the I-beam support, one of said clamps carrying a brace member engaging the web of the I-beam support on the other side of the I-beam support.

6. A clamp for attaching the shank of a ground working tool to the flange of an I-beam member including a plate portion having laterally spaced face portions corresponding to the bottom face of the lower flange of the I-beam member and having an intermediate portion downset from said face portions to accommodate the shank under said bottom face, clamping flanges connected with the plate portion and extending transversely across said laterally spaced face portions and spaced therefrom to accommodate the lower flange of the I-beam therebetween, means carried by said downset portion and engaging against said shank for drawing the clamping flanges into contact with upper faces of the lower flange and the shank into contact with said bottom face of the I-beam flange, a clamp member having a hook portion engageable over the upper flange of the I-beam member, and a fastening device connecting the upper clamp member with said shank.

7. A clamp for attaching the shank of a ground working tool to the flange of an I-beam member including a plate portion having laterally spaced face portions corresponding to the bottom face of the lower flange of the I-beam member and having an intermediate portion downset from said face portions to accommodate the shank under said bottom face, clamping flanges connected with the plate portion and extending transversely across said laterally spaced face portions and spaced therefrom to accommodate the lower flange of the I-beam member therebetween, set screws threadedly carried by said intermediate portion of the plate portion of the clamp and adapted to engage the shank for drawing the clamping flanges into contact with the upper faces of the I-beam flange and to move the shank into clamping contact with said bottom face, a clamp member having a hook portion engageable over the upper flange of the I-beam member, and a fastening device for connecting the clamp member directly with said shank.

8. A clamp for attaching the shank of a ground working tool to the flange of an I-beam member including a plate portion having laterally spaced face portions corresponding to the bottom face of the lower flange of the I-beam member and having an intermediate portion downset from said face portions to accommodate the shank under said bottom face, clamping flanges connected with the plate portion and extending transversely across said laterally spaced face portions and spaced therefrom to accommodate the lower flange of the I-beam therebetween, means for drawing the clamping flanges into contact with the upper faces of the lower flange and the shank into contact with said bottom face of the I-beam flange, a clamp member having a hook portion engageable over the upper flange of the I-beam member, a fastening device connecting the upper clamp member with said shank, and a brace on the clamping flange on the side of the I-beam member opposite said bolt and engageable with the web of said I-beam member.

9. A clamp for attaching the shank of a ground working tool to the flange of a frame member including a plate portion having laterally spaced faces corresponding to a face of the beam flange and having an intermediate portion downset from said face portions to accommodate the shank under said flange of the frame member, clamping flanges connected with the plate portion and extending transversely across said face portions and spaced therefrom to accommodate the flange of the frame member therebetween, means for drawing the clamping flanges into contact with opposite faces of the flange of the frame member and the shank into contact with said first mentioned face of the said frame member flange, said shank being adapted to project from the plate portion and having an aperture in the projecting end, a clamp plate having a hook-like portion engaging over the top of said frame member and an apertured portion registering with the aperture of said shank, and a fastening device extending through said apertures to connect the clamp plate with said shank.

10. A clamp for attaching the shank of a ground working tool to the flange of a frame member including a plate portion having laterally spaced faces corresponding to a face of the beam flange and having an intermediate portion downset from said face portions to accommodate the shank under said flange of the frame member, clamping flanges connected with the plate portion and extending transversely across said face portions and spaced therefrom to accommodate the flange of the frame member therebetween, means for drawing the clamping flanges into contact with opposite faces of the flange of the frame member and the shank into contact with said first mentioned face of the said frame member flange, said shank being adapted to project from the plate portion and having an aperture in the projecting end, a clamp plate having a hook-like portion engaging over the top of said frame member and an apertured portion registering with the aperture of said shank, a fastening device extending through said apertures to connect the clamp plate with said shank, and a brace arm engaging the frame member on the side opposite the fastening device.

11. A clamp for attaching the shank of a ground working tool to the flange of an I-beam member including a plate portion having laterally spaced face portions corresponding to a face of the lower flange of said I-beam member and having an intermediate portion downset from said face portions to accommodate the shank under said face of the I-beam flange, clamping flanges connected with the plate portion and extending transversely across said laterally spaced face portions and spaced therefrom to accommodate the lower I-beam flange therebetween, means for drawing the clamping flanges into contact with upper faces of the lower I-beam flange and the shank into contact with the under face of the I-beam flange, said plate portion being divided intermediate said clamping flanges, ears on said plate portion at the respective sides of the division, fastening devices extending through said ears, a brace member on one of said divisions for engaging the web of the I-beam member near the upper flange, a clamp plate for extending across the upper flange and having a hook portion engaging the upper flange on the side of the brace member, and means for securing the clamp plate directly with the shank on the other side of the I-beam member.

12. Clamp means for mounting the shank of a ground working tool transversely of an I-beam shaped support of an agricultural machine, comprising clamps respectively engaging upper and lower flanges of said I-beam, means for securing the clamp engaging the lower flange to the lower flange of the I-beam and said shank to said lower clamp, and means connecting the shank with the clamp engaging the upper flange and for securing said clamp to the upper flange of the I-beam.

WILLIAM T. GRAHAM.

REFERENCES CITED

The following references are of record in the file of this patent:

UNITED STATES PATENTS

| Number | Name | Date |
|---|---|---|
| 656,275 | Streeter | Aug. 21, 1900 |
| 2,029,249 | Noell et al. | Jan. 28, 1936 |
| 2,080,916 | Hayden | May 18, 1937 |
| 2,361,605 | Cross | Oct. 31, 1944 |